United States Patent [19]

Wassermann et al.

[11] 4,048,295

[45] Sept. 13, 1977

[54] PROCESS FOR MAKING EXTRUDATES FROM ALUMINUM OXYHYDRATES

[75] Inventors: Martin Wassermann, Hamburg; Arnold Meyer, St. Michaelisdonn, both of Germany

[73] Assignee: Condea Chemie GmbH, Germany

[21] Appl. No.: 641,170

[22] Filed: Dec. 16, 1975

[30] Foreign Application Priority Data

Dec. 21, 1974 Germany .............................. 2460921

[51] Int. Cl.$^2$ ............................................. C01F 7/02
[52] U.S. Cl. .................................... 423/626; 423/628; 423/630; 423/631; 252/463
[58] Field of Search ............... 423/625, 626, 630, 628, 423/631; 252/463

[56] References Cited

U.S. PATENT DOCUMENTS

| 3,385,663 | 5/1968 | Hughes | 423/626 |
| 3,808,153 | 4/1974 | Chomitz et al. | 423/626 |
| 3,839,230 | 10/1974 | Cobzaru | 423/625 |
| 3,846,540 | 11/1974 | Leach | 423/628 |
| 3,917,808 | 11/1975 | Leach et al. | 423/630 |
| 3,945,945 | 3/1976 | Kiovsky et al. | 423/628 |
| 3,975,509 | 8/1976 | Royer et al. | 423/628 |
| 3,975,510 | 8/1976 | Leach et al. | 423/628 |

*Primary Examiner*—Herbert T. Carter
*Attorney, Agent, or Firm*—Cushman, Darby & Cushman

[57] ABSTRACT

Formed products are made from aqueous aluminum oxyhydrate by peptizing the aqueous aluminum oxyhydrate with an acid and then subsequently adding a dilute solution of ammonia or an ammonia yielding compound following by extrusion, drying and calcining.

10 Claims, No Drawings

PROCESS FOR MAKING EXTRUDITES FROM ALUMINUM OXYHYDRATES

The invention relates to a process for producing formed articles or bodies from aluminum oxyhydrate, and in particular extrudates thereof.

As used herein the term aluminum oxyhydrate means a compound of the formula AlO(OH) $xH_2O$, whereby $x$ is 0.5 to 1.5; these alumina compounds are sometimes also named alpha alumina monohydrate (Alcoa) or Boehmite.

Aluminum oxide is used as a catalyst or catalyst carrier for numerous chemical reactions, particularly in the petroleum industry. In most production processes relatively dense aluminum oxide products with a low porosity are obtained which are uneconomical and less effective. In order to produce extrudates with a lower bulk density and larger pore volume, it is known, for example, from German Offenlegungschrifts Nos. 2,236,262 and 2,237,861 to mix aluminum oxyhydrate mixtures with water and acid to form an extrudable mixture. Depending on the compression pressure used during the extrusion process, products with a bulk density of 0.30 to 0.60 g/ml, a surface area of 150 to 350 m²/g and a pore volume of 0.8 to 2.0 ml/g obtained.

Similar results are obtained with the process according to German Offenlegungsschrift No. 2,237,861 by treating the aluminum oxyhydrate with ammonia, ammonium carbonate or ammonium bicarbonate instead of acid.

The disadvantage of these processes, although giving products with a higher pore volume and a lower bulk density, is that on the one hand the pore diameter distribution is extremely irregular, and the pores have a preferred range between 40 and 60 A. On the other hand, when the extrudates are introduced into an impregnating solution for producing catalysts, the extrudates shatter and cannot be used. This tendency to shatter on introduction to water can indeed be counteracted by an over-high compression pressure during extruding, but the surface suffers as a result.

The object of the present invention is to develop a novel process in which formed articles or bodies are obtained having an extremely high pore volume of an order of magnitude exceeding 0.8 ml/g, an adequate strength and whose bulk density is in the range from 0.35 to 0.5 g/ml, but wherein despite this increase in the pore volume the overall surface area of the extrudates is not essentially larger than that of products produced by known processes, whereby however, the pore diameter distribution is much more uniform and there is a larger proportion of pores with a diameter above 60 A which is desirable for numerous applications such as, for example, the desulfurization of heavy oils.

According to the invention, this object is achieved by a process for the production of formed articles or bodies of aluminum oxyhydrate and more paricularly extrudates in which the aluminum oxyhydrate is formed into a paste with additives dissolved in aqueous solutions and subsequently formed and more particularly extruded, which method is characterized in that the aluminum oxyhydrate is peptized with an organic or inorganic acid in manner known per se, and is subsequently mixed with a dilute ammonia solution or with a solution of an $NH_3$-yielding compound and the mass is subsequently extruded, dried and calcined.

It has surprisingly been found that such a process leads to a considerable improvement of the pore diameter distribution and a much better resistance to shattering on introduction into aqueous solutions, because such results are not obtained when the aluminum oxyhydrate is formed into a paste with only the acid or with only the ammonia solution. It is particularly surprising that such a result is not obtained if the mass is first treated with ammonia and then with the acid.

The aluminum oxyhydrate which is preferably used is an α-aluminum oxyhydrate of the Boehmite type containing 65 to 85% by weight of $Al_2O_3$, a bulk density of 500 to 700 g/l, a specific surface area of 140 to 300 m²/g according to B.E.T. and an average particle size below 100 μm. Preferably an aluminum oxyhydrate is used which is obtained by aqueous hydrolysis of a mixture of $C_2$-$C_{24}$ + and preferably $C_4$-$C_{20}$ straight chain aluminum alcoholates (alcoxides) obtained according to the ZIEGLER process and which complies with the above specification.

To peptize the aluminum oxyhydrate a 0.3 to 10%, and preferably 2 to 3% nitric acid or a 0.5 to 1.5% acetic acid or a 1.5 to 2.5% citric acid solution is used.

Instead of nitric acid, or the other acids mentioned above it is also possible to use hydrochloric acid, sulfuric acid, formic acid, propionic acid, monochloroacetic acid, dichloro-acetic acid, or trichloro-acetic acid. The particular acid is not critical.

Following acid peptizing the mass is treated with 0.1 to 3 and preferably 0.5% by weight $NH_3$-solution. It is also possible to use a corresponding ammonium carbonate or bicarbonate solution or hexamethylenetetramine or urea and/or generally products which form $NH_3$ by decomposition.

In general, about 50 to 70 and preferably 65 parts by weight of the acid solutions, and 35 to 50, preferably 45 parts by weight of the ammonia solution are used for 100 parts by weight aluminum oxyhydrate.

The mass is mixed at between ambient (room) temperature and about 90° C, working preferably taking place at temperatures between 40° and 50° C. The subsequent drying and calcining take place under known conditions for example at 500° to 600° C for about 3 hours. Unless otherwise indicated all parts and percentages are by weight.

EXAMPLE

One-hundred parts by weight of an aluminum oxyhydrate obtained by hydrolysis of a mixture of $C_4$-$C_{20}$ straight chain aluminum alcoholates was peptized with 65 parts by weight of a 2% $HNO_3$ and then, accompanied by the addition of 45 parts by weight of a 0.5% $NH_3$-solution was kneaded and extruded. The extruded products with a diameter of about 3 to 4 mm were dried for 1 hour at 110° C and subsequently calcined for 3 hours at 550° C.

For comparison purposes, extrudates were produced in exactly the same way, but after peptizing extrusion took place without any addition of $NH_3$-solution. The results are given in the following Table whereby in each case 200 g of aluminum oxyhydrate were used.

The values in Table 1 clearly show that the formed articles or bodies produced with an $NH_3$ addition have an approximately 20% higher pore volume and an up to 40% lower bulk density than the extrudates produced without any $NH_3$-addition. The values further show that despite the increase in the pore volume the surface area of the extrudates treated according to the invention is not notably larger than that of the extrudates produced according to the comparison processes which show that there has been a change in the pore diameter distribution.

An important feature is that the formed articles or bodies produced according to the process of the invention are stable when placed in water, whereas the extrudates produced according to the known processes shatter into numerous small pieces when placed in water.

The pore diameter distribution, measured on two molded articles or bodies, one having been produced according to a conventional process and the other by adding 0.5% of $NH_3$-solution according to the present invention, can be gathered from the following Table 2.

The process can comprise/consist essentially of the steps and materials set forth.

TABLE 1

| g 2.1% $HNO_3$ | g $H_2O$ | g $NH_3$-Solution | Compression Pressure kg/cm$^2$ | Strength kg/cm$^2$ | Surface Area m$^2$/g | Pore Volume ml/g | Behavior in $H_2O$ | Bulk Density g/ml |
|---|---|---|---|---|---|---|---|---|
| 132 | 71 | — | 48 | 9.7 | 210 | 0.71 | shattered | 0.55 |
| 132 | — | 93/0.5% | 35 | 8.0 | 218 | 0.81 | stable | 0.42 |
| 132 | 71 | — | 62 | 9.3 | 200 | 0.74 | shattered | 0.57 |
| 132 | — | 93/0.5% | 48 | 8.5 | 207 | 0.87 | stable | 0.43 |
| 132 | 71 | — | 30 | 8.1 | 230 | 0.73 | shattered | 0.55 |
| 132 | — | 93/0.5% | 50 | 7.9 | 225 | 0.92 | stable | 0.40 |
| 132 | 74 | — | 20 | 6.4 | 225 | 0.77 | shattered | 0.58 |
| 132 | — | 110/0.5% | 25 | 7.0 | 220 | 0.85 | stable | 0.40 |
| 132 | 71 | — | 50 | 8.7 | 214 | 0.75 | shattered | 0.56 |
| 132 | — | 93/0.5% | 70 | 8.0 | 202 | 0.98 | stable | 0.40 |
| 132 | 71 | — | 50 | 8.2 | 187 | 0.73 | shattered | 0.55 |
| 132 | — | 93/0.5% | 60 | 7.7 | 188 | 0.85 | stable | 0.43 |
| 132 | 71 | — | 70 | 8.8 | 209 | 0.77 | shattered | 0.58 |
| 132 | — | 93/0.5% | 45 | 7.9 | 192 | 0.85 | stable | 0.44 |

TABLE 2

| Extrudate Produced According to Conventional Process | | Extrudate Produced with $NH_3$-Solution | |
|---|---|---|---|
| Pore volume: | 0.71 ml/g | Pore volume: | 0.81 ml/g |
| ≦ 30Å | 0.11 ml/g | | 0.16 ml/g |
| ≦ 40Å | 0.22 ml/g | | 0.27 ml/g |
| ≦ 50Å | 0.32 ml/g | | 0.33 ml/g |
| ≦ 60Å | 0.47 ml/g | | 0.38 ml/g |
| ≦ 70Å | 0.51 ml/g | | 0.42 ml/g |
| ≦ 80Å | 0.53 ml/g | | 0.46 ml/g |
| ≦ 90Å | 0.54 ml/g | | 0.54 ml/g |
| ≦100Å | 0.56 ml/g | | 0.63 ml/g |
| ≦150Å | 0.57 ml/g | | 0.73 ml/g |
| ≦300Å | 0.59 ml/g | | 0.75 ml/g |
| ≦800Å | 0.63 ml/g | | 0.76 ml/g |
| >800Å | 0.71 ml/g | | 0.81 ml/g |

What is claimed is:

1. A process consisting essentially of peptizing with an aqueous acid selected from the group consisting of nitric acid, acetic acid, citric acid, hydrochloric acid, sulfuric acid, formic acid, propionic acid, monochloracetic acid, dichloroacetic acid and trichloroacetic acid at a concentration of 0.3 to 10% a Boehmite aluminum oxyhydrate containing 65 to 85% by weight $Al_2O_3$, a bulk density of 500 to 700 g/l, a B.E.T. specific surface area of 140 to 300 m$^2$/g and an average particle size below 100 microns, then adding an aqueous solution of ammonia or an ammonia liberating compound having a concentration of 0.1 to 3%, there being employed 50 to 70 parts of acid solution and 35 to 50 parts of ammonia solution per 100 parts of aluminum oxyhydrate, to form an extrudable mass, extruding said extrudable mass, drying and then calcining the extrudate.

2. The process of claim 1 wherein the ammonia liberating compound is selected from the group consisting of ammonium carbonate, ammonium bicarbonate, urea and hexamethylenetetramine.

3. The process of claim 1 wherein there is used ammonia.

4. The process of claim 3 wherein the acid is nitric acid.

5. The process of claim 1 wherein the aluminum oxyhydrate employed has been prepared by hydrolysis of an aluminum alkoxide.

6. The process of claim 1 wherein there is employed ammonia having a concentration of 0.1 to 3%.

7. The process of claim 6 wherein the ammonia concentration is 0.5%.

8. The process of claim 6 wherein the acid is nitric acid of 2 to 3% concentration.

9. The process of claim 6 wherein the acid is acetic acid of 0.5 to 1.5% concentration.

10. The process of claim 6 wherein the acid is citric acid of 1.5 to 2.5% concentration.

* * * * *